United States Patent
Lau et al.

(10) Patent No.: US 9,436,974 B2
(45) Date of Patent: Sep. 6, 2016

(54) METHOD AND APPARATUS TO RECOVER SCENE DATA USING RE-SAMPLING COMPRESSIVE SENSING

(71) Applicant: Vencore Labs, Inc., Basking Ridge, NJ (US)

(72) Inventors: Chi Leung Lau, Basking Ridge, NJ (US); Ted K. Woodward, Basking Ridge, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 14/629,870

(22) Filed: Feb. 24, 2015

(65) Prior Publication Data
US 2015/0243004 A1    Aug. 27, 2015

Related U.S. Application Data (60) Provisional application No. 61/943,550, filed on Feb. 24, 2014.

(51) Int. Cl.
  *G06T 3/40* (2006.01)
  *G01S 17/89* (2006.01)
  *G01S 7/48* (2006.01)

(52) U.S. Cl.
  CPC ............... *G06T 3/40* (2013.01); *G01S 7/4808* (2013.01); *G01S 17/89* (2013.01)

(58) Field of Classification Search
  None
  See application file for complete search history.

(56) References Cited

U.S. PATENT DOCUMENTS

| | | | |
|---|---|---|---|
| 7,065,449 B2 | 6/2006 | Brewster et al. | |
| 7,289,049 B1* | 10/2007 | Fudge | H03M 1/1245 341/123 |
| 8,519,343 B1 | 8/2013 | Mihailescu et al. | |
| 8,863,044 B1* | 10/2014 | Casati | G06F 17/5081 716/106 |
| 9,042,560 B2* | 5/2015 | Ojala | G10L 19/02 381/23 |
| 2010/0290395 A1* | 11/2010 | Sexton | H04L 67/12 370/328 |
| 2011/0260036 A1 | 10/2011 | Baraniuk et al. | |
| 2012/0016921 A1* | 1/2012 | Davenport | H03M 7/30 708/322 |
| 2012/0038817 A1 | 2/2012 | McMackin et al. | |
| 2012/0229668 A1 | 9/2012 | Meyers et al. | |

(Continued)

OTHER PUBLICATIONS

Howland, Gregory, et al. "Compressive sensing LIDAR for 3D imaging." Lasers and Electro-Optics (CLEO), 2011 Conference on. IEEE, 2011.*

(Continued)

*Primary Examiner* — Li Liu
(74) *Attorney, Agent, or Firm* — Matthew M. Hulihan, Esq.; Heslin Rothenberg Farley & Mesiti, PC (57) ABSTRACT

Methods, computer program products, and computer systems for recovering data of scene are provided. The techniques include: obtaining, by at least one processor, data of a scene; re-sampling, by the at least one processor, the data of the scene to obtain re-sampled sensing data of the scene and a corresponding sensing matrix; and constructing, by the at least one processor, recovered data of the scene using the re-sampled sensing data of the scene and the corresponding sensing matrix. In one embodiment, the method includes enhancing occluded data of the scene to construct the recovered data of the scene, where the recovered data of the scene facilitates identification of the scene. In another embodiment, the method includes compressing original data of a scene, the compressing including sampling the original data of the scene to select the data of the scene.

20 Claims, 7 Drawing Sheets

(56) References Cited

U.S. PATENT DOCUMENTS

| | | | | |
|---|---|---|---|---|
| 2012/0250748 | A1* | 10/2012 | Nguyen | G01S 13/90 375/224 |
| 2012/0251013 | A1* | 10/2012 | Porikli | H03M 7/30 382/233 |
| 2013/0142409 | A1* | 6/2013 | Chinn | A61B 6/5205 382/131 |
| 2013/0149959 | A1* | 6/2013 | Beadle | H04B 1/0025 455/39 |
| 2013/0151924 | A1* | 6/2013 | Beadle | H04L 69/04 714/763 |
| 2013/0243334 | A1 | 9/2013 | Meyers et al. | |
| 2013/0289942 | A1* | 10/2013 | Wu | G06F 17/16 702/189 |
| 2014/0046208 | A1* | 2/2014 | Sejdic | A61B 5/7232 600/528 |
| 2014/0181166 | A1* | 6/2014 | Chuang | G06F 7/582 708/250 |
| 2014/0198236 | A1* | 7/2014 | Herman | H04N 5/335 348/239 |
| 2015/0215529 | A1* | 7/2015 | Wang | G06T 5/007 348/218.1 |

OTHER PUBLICATIONS

Baraniuk, Richard G. "Compressive sensing." IEEE signal processing magazine 24.4 (2007).*

Josef D. Allen et al., A Compressed Sensing Method with Analytical Results for Lidar Feature Classification, 12 pages, date unknown.

Suresh K. Lodha et al., Aerial LiDAR Data Classification Using Support Vector Machines (SVM), 8 pages, date unknown.

Ian Blanes et al., Classification of Hyperspectral Images Compressed Through 3D-JPEG2000, Springer-Verlag Berlin Heidelberg, pp. 416-423, 2008.

Juan Castorena et al., Compressive Sampling of Lidar: Full-Waveforms as Signals of Finite Rate of Innovation, 20th European Signal Processing Conference, Bucharest, Romania, pp. 984-988, Aug. 27-31, 2012.

G.A. Howland et al., Compressive Sensing LIDAR for 3D Imaging, Lasers and Electro-Optics, 2011, Abstract only.

Jan Biesemans et al., Image Processing Workflows for Airborne Remote Sensing, Proceedings 5$^{th}$ EARSeL Workshop on Imaging Spectroscopy, Bruges, Belgium, pp. 1-14, Apr. 23-25, 2007.

Nicolas David et al., Library Concept and Design for Lidar Data Processing, 6 pages, Date unknown.

Mark A. Fonstad et al., Remote Sensing of Stream Depths with Hydraulically Assisted Bathymetry (HAB) Models, Geomorphology 72, pp. 320-339, 2005.

Bin Wu et al., Resampling and Compression on 3D Range Data from a LIDAR, 7 pages, Data unknown.

David Gingras et al., Rough Terrain Reconstruction for Rover Motion Planning, 8 pages, Date unknown.

Marco F. Duarte et al., Single-Pixel Imaging Via Compressive Sampling, IEEE Signal Processing Magazine, 83, 9 pages, Mar. 2008.

Allen Y. Yang et al., Towards Compressive Geospatial Sensing Via Fusion of LIDAR and Hyperspectral Imaging, GRID Workshop, 13 pages, 2010.

* cited by examiner

METHOD AND APPARATUS TO RECOVER SCENE DATA USING RE-SAMPLING COMPRESSIVE SENSING

CROSS-REFERENCE TO RELATED APPLICATIONS

This application claims the benefit of U.S. Provisional Patent Application No. 61/943,550, filed Feb. 24, 2014, which is hereby incorporated herein by reference in its entirety.

FIELD OF THE INVENTION

The present invention relates to recovering data, such as scene data or point cloud data, and more particularly to a method and apparatus to recover scene data using re-sampling compressive sensing.

BACKGROUND OF THE INVENTION

As data collection technologies continue to improve, resulting in increasingly large volumes of collected data, numerous problems related to managing, analyzing, and/or processing such data continue to arise. For example, certain applications, such as light data and ranging (LIDAR), can allow for capturing large amounts of data, such as three-dimensional scene data, but processing such data may not be possible due to limitations in the capacity of current technologies. In addition, collected data may include an occluded scene of interest, interfering with data analysis, such as scene identification. Further, collected data may be incomplete or damaged, precluding or impeding analysis. Therefore, a need exists for improvements to data management, analysis, and processing technologies to accommodate increasingly large volumes of collected data.

BRIEF SUMMARY

The shortcomings of the prior art are overcome, and additional advantages are provided, through the provision, in one aspect, of a method. The method includes: obtaining, by at least one processor, data of a scene; re-sampling, by the at least one processor, the data of the scene to obtain re-sampled sensing data of the scene and a corresponding sensing matrix; and constructing, by the at least one processor, recovered data of the scene using the re-sampled sensing data of the scene and the corresponding sensing matrix.

Computer systems, computer program products and methods relating to one or more aspects of the technique are also described and may be claimed herein. Further, services relating to one or more aspects of the technique are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, techniques for re-sampling compressive sensing, to recover data, such as three-dimensional point cloud data, of a scene, in order to, for example, reduce the number of acquired samples. In, for example, light detection and ranging (LIDAR) applications, it may be advantageous to sample, or capture, data of a scene once, and then process that data, either within the LIDAR system, or in a remote system, to recover the data. Such a configuration allows use of a lower sampling rate, for example, or the use of the same sampling rate with a higher quality result.

Note that the techniques explained herein allow the benefit of reducing the sampling rate of a sensor system, such as a LIDAR system. In another embodiment, where a sensor system inherently has fewer samples than the Nyquist rate, the present techniques may be considered or used as an image enhancement technique. In such an embodiment, the method described herein of recovering data of a scene may be used to enhance data of the scene, by recovering more information of the scene.

The techniques of the present disclosure are improvements to computer systems and related technologies, including improvements to data processing systems, image processing systems, or other such computer systems that are used to process data, including scene data, for use in data analysis, such as scene identification.

In general, the techniques of the present disclosure can be used for data compression, allowing a larger amount of data to be stored in a specified computer storage device or transmitted over a specified data transmission mechanism. In addition, the techniques can be used for data enhancement, because the techniques can be used to reconstruct more complete versions of scene data from either partial data sets or occluded data sets. In addition, the techniques can be used to provide enhanced image processing for LIDAR and/or other imaging techniques. For example, outfitting special purpose LIDAR and/or image processing devices to include the techniques described herein, will allow for devices with enhanced functionality, including data enhancement and compression. Further, the techniques described herein are improvements to the field of image identification. By allowing for reconstruction of occluded image data, images therein can be analyzed in more detail, for example, by being identified to a greater degree of accuracy.

More specifically, the techniques described herein can be used in the technical/technology field of image detections. Using the techniques disclosed herein, deficiencies of current image detection systems can be mitigated by pre-processing scene data to mitigate the impact of occlusions or partial data loss. By employing such techniques, including occlusion avoidance and de-noising of scene data, the signal to noise ratio of the data is enhanced, and will be greater than the signal to noise ratio of the initial data, as described below with respect to, for example, FIGS. 4C-4E.

The techniques described herein may be employed with scene data related to a variety of different scenes or objects. For example, scenes or objects include, but are not limited to atmospheric phenomena, aircraft, ground terrain, ocean currents, sea floors, and/or any other soft or hard target objects about which scene data or information may be desired.

The techniques described herein may be used in a variety of different information detection applications, including geological applications, defense applications, security verification, surveying, mechanical assembly, robotics, entertainment, and so forth. For instance, the information to be detected may be three dimensional situational awareness and terrain mapping. In one example, the information may be facial recognition of a person, for authentication purposes. In another example, the information may relate to meteorological phenomenon, used by a weather service to predict short term weather patterns, or to analyze long term trends. In a further example, the information may be position, velocity, and/or identification information of a hard target, such as an aircraft or satellite.

Reference is made below to the drawings, which are not drawn to scale for ease of understanding, wherein the same reference numbers used throughout different figures designate the same or similar components.

By way of summary, FIGS. 1A-1D illustrate aspects of embodiments of a method for recovering data of a scene 100, in accordance with one or more aspects of the present invention. For instance, method 100 includes: obtaining, by at least one processor, data of a scene 110; re-sampling, by the at least one processor, the data of the scene to obtain re-sampled sensing data of the scene and a corresponding sensing matrix 120; and constructing, by the at least one processor, recovered data of the scene using the re-sampled sensing data of the scene and the corresponding sensing matrix 130.

Figure 1A:
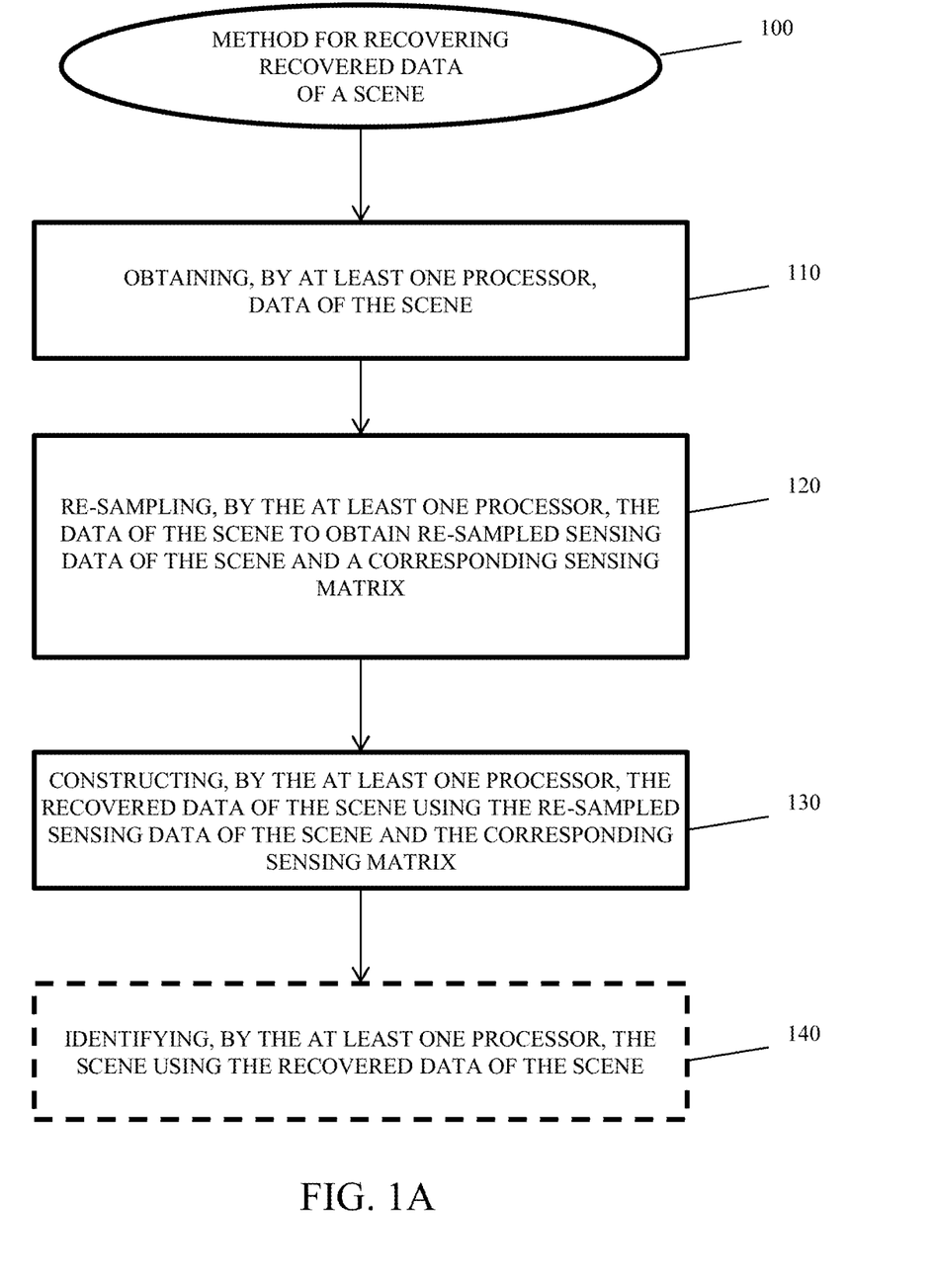
FIGS. 1A-1C depict multiple embodiments of processes for recovering data of a scene, in accordance with one or more aspects of the present invention.
Figure 1B:
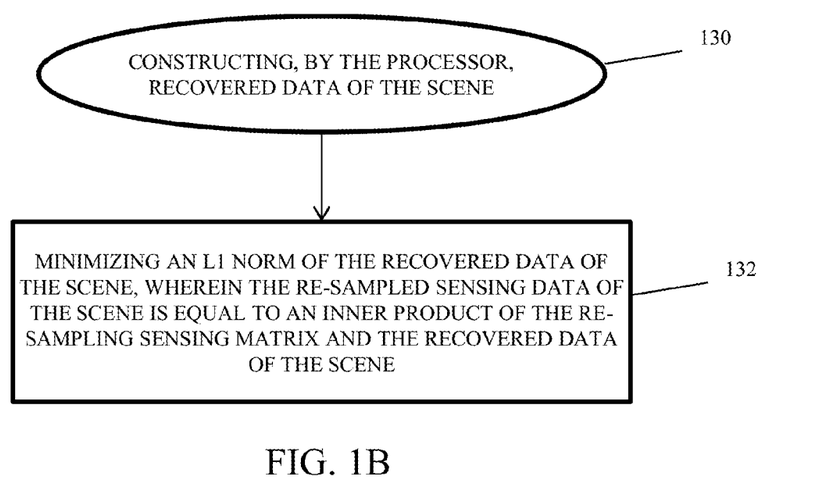
Figure 1C:
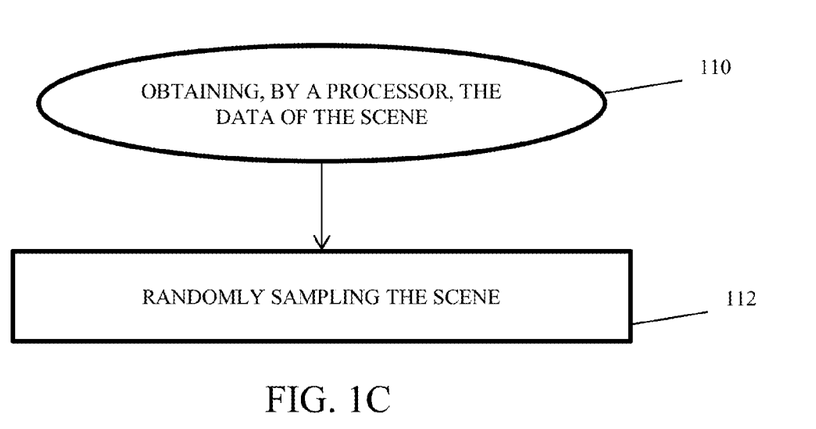

In one embodiment, method 100 further includes: identifying, by the at least one processor, the scene using the recovered data of the scene 140.

In another embodiment, the data of the scene comprises occluded data of the scene, and the constructing 130 comprises: enhancing the occluded data of the scene to construct the recovered data of the scene, wherein the recovered data of the scene facilitates identification of the scene.

In a further embodiment, the obtaining 110 comprises: compressing original data of a scene, the compressing comprising sampling the original data of the scene to select the data of the scene, wherein the original data of the scene has a first size and the data of the scene has a second size, the second size being smaller than the first size. In such a case, for example, method 100 can further include: transmitting, by the at least one processor, the data of the scene.

In one embodiment, the constructing 130 comprises minimizing an L1 norm of the recovered data of the scene. In another embodiment, the constructing 130 comprises selecting the re-sampled sensing data of the scene to be equal to an inner product of the sensing matrix and the recovered data of the scene.

In another embodiment, the obtaining 110 comprises randomly sampling the scene to determine the data of the scene. In a further embodiment, the random sampling comprises non-Gaussian sampling.

In the embodiment illustrated in FIG. 1A, the recovering includes: obtaining, by a processor, the data of the scene 110; re-sampling, by the processor, the data of the scene to obtain re-sampled data of the scene and a sensing matrix 120; and constructing, by the processor, recovered data of the scene using the re-sampled data of the scene and the sensing matrix 130.

The compressive sensing technique for constructing the recovered data of the scene may be any compressive sensing technique known in the art. Typically, compressive sensing techniques require capturing large amounts of random projections of data in sequence. In an embodiment of the present technique, the data of the scene may be obtained once, eliminating a major bottleneck of traditional compressive sensing.

Figure 3A:
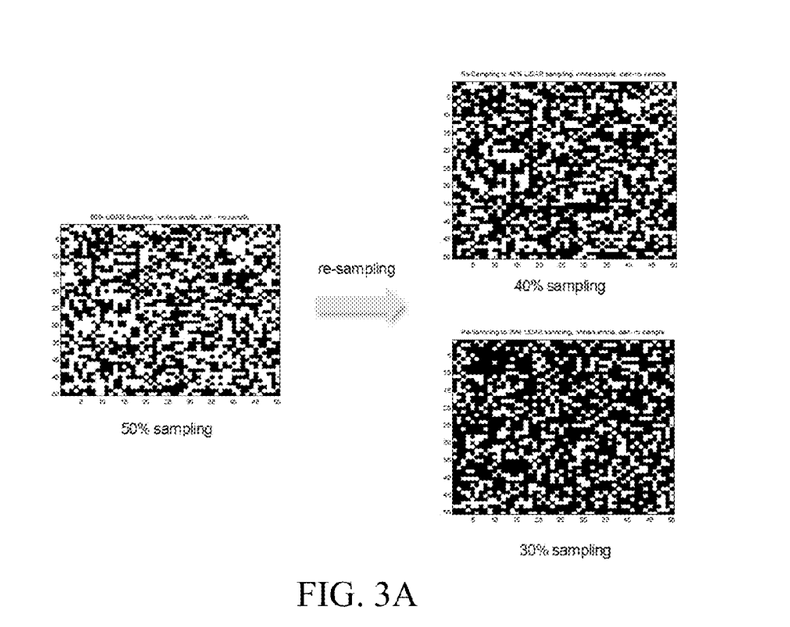
FIG. 3A depicts re-sampling at different rates, in accordance with one or more aspects of the present invention.

In an embodiment of the present technique, the technique may work as follows. Suppose an $\sqrt{n} \times \sqrt{n}$ point cloud C is represented by a vector x, which is formed by vectorizing C column-by-column. Define $r_s$ as an 1×n vector with random entries of 1's and 0's, such that the sampling rate (i.e. density of 1's) is $\phi$ (e.g. $\phi=0.5$). Also let $x_{r_s}$ be corresponding LIDAR samples such that $x_{r_s}(i)$ is the i-th LIDAR sample if $r_s(i)$ is "1", otherwise it is equal to "0". The following is an example of $x_{r_s}$ and $r_s$.

$$r_s = [1\ 0\ 0\ 1\ 1\ 0\ 1\ \ldots\ 1]; \rightarrow x_{r_s} = [x_1\ 0\ 0\ x_4\ x_5\ 0\ x_7\ \ldots\ x_n]; \quad (1)$$

where $x_i$ is the i-th LIDAR sample. Therefore, the positions of the 1's in $r_s$ corresponds to the locations of the LIDAR samples in $x_{r_s}$. Next, we define a re-sampling process as follows:

for $i = 1$ to $m$, (2)

for $j = 1$ to $n$, if $r_s(j) = 1$, $$r_i(j) = \begin{cases} 1 & \text{with probability } \rho \\ 0 & \text{with probability } 1-\rho \end{cases}$$

else $$r_i(j) = 0$$

end end end where $\rho$, a design parameter to be determined, is used to control $\alpha$, the overall density of 1's, such that $\alpha=\phi\rho$. For example, if $\phi=0.5$ and an overall 1's density of 0.4 is desired, $\rho$ is set to be 0.8. An example of the result of re-sampling for different $\rho$'s is shown in FIG. 3A.

Next, we will use (2) to generate m rows of the new sampling matrix. The re-sampling process (2) is applied m times to give m row vectors, $r_i$, $1 \leq i \leq m$, which are stacked together to create the new sensing matrix B, such that, $$B = \begin{bmatrix} r_1 \\ r_2 \\ \vdots \\ r_m \end{bmatrix} \quad (3)$$

Corresponding to the $r_i$'s are the re-sampled data $x_{r_i}$, $1 \leq i \leq m$ as described in (1). Note that all the $x_{r_i}$'s are generated from a single set of LIDAR samples $x_{r_s}$.

From B and $x_{r_i}$, we can generate the new m×1 CS sensing data, $y_b$, given by, $$y_b = B\, x_{r_s} \quad (4)$$

Therefore, $y_b$ corresponds to the projection of the LIDAR point cloud ($x_{r_s}$) onto a re-sampling space of the new sensing matrix. Note that due to the re-sampling process, the only LIDAR data captured is $x_{r_s}$. All the $y_b$'s are obtained without acquiring new LIDAR samples.

As illustrated in FIG. 1B, in an embodiment of the present technique, the constructing 130 includes: minimizing an L1 norm of the recovered data of the scene, wherein the re-sampled sensing data ($y_b$) of the scene is equal to an inner product of the re-sampling sensing matrix and the recovered data of the scene 132.

In an embodiment, the recovered data of the scene may be obtained as follows. Suppose a LIDAR point cloud is sampled randomly to obtain $x_{r_s}$. Using the re-sampling process described in (2) and (4), we can write, $$y_b = B\, x_{r_s} \Rightarrow y_b = B\, x \quad (5)$$

(5) is true because the positions of the 0's in of $x_{r_s}$ corresponds to those of $r_s$'s. According to CS theory, if $m > k \log(n/k)$, it can be recovered with high probability. We next express x in a transform domain, where the discrete cosine transform (DCT) domain is used as one example only, $$\theta = Tx \text{ where T is the DCT operator} \quad (6)$$

$$x = T^T \theta\ \ T^T \text{ is the inverse DCT operator} \quad (7)$$

If $\theta$ is k-sparse, the CS recovery is given by, $$\min \|\theta\|_1 \quad (8)$$

subject to: $\|y_b - BT^T\theta\|_2 \leq \epsilon$

As illustrated in FIG. 1C, in an embodiment of the present technique, the obtaining 110 includes: randomly sampling the scene 112. In one embodiment, such sampling may be done by one or more LIDAR systems. If multiple LIDAR nodes collaboratively acquired data of the same scene, the re-sampling mechanism described above can be applied to each set of the data from the LIDAR nodes.

Figure 2A:
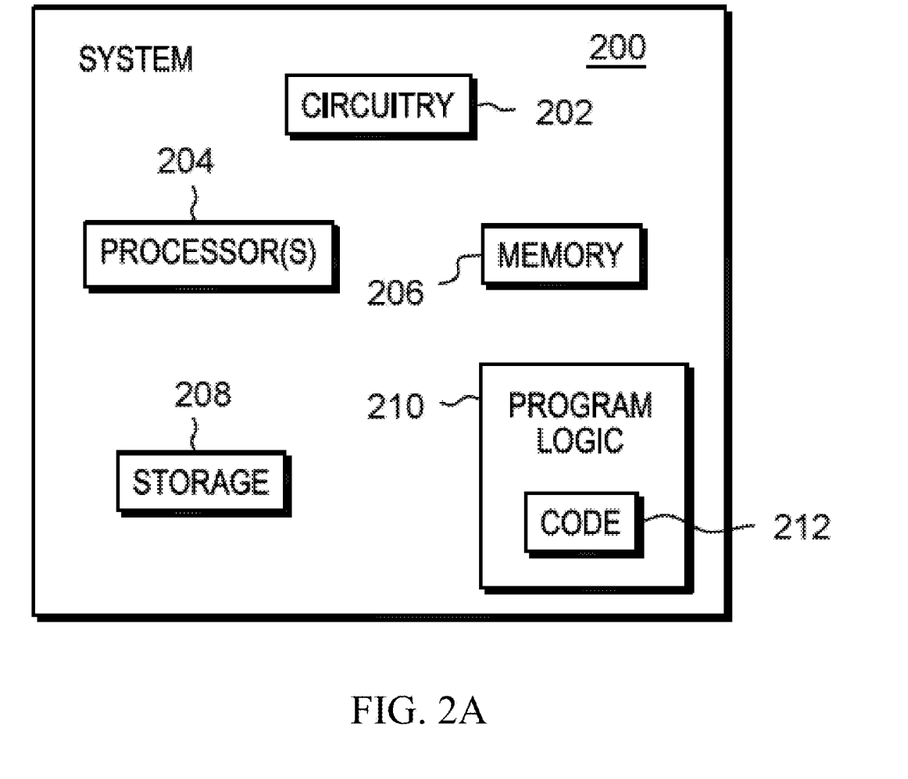
FIG. 2A depicts one embodiment of a single processor computing environment to incorporate and use one or more aspects of the present invention.

Turning to FIG. 2A, a resource 200 may include a circuitry 202 that may in certain embodiments include a microprocessor 204. The computer system 200 may also include a memory 206 (e.g., a volatile memory device), and storage 208. The storage 208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 208 may comprise an internal storage device, an attached storage device and/or a network accessible storage device. The system 200 may include a program logic 210 including code 212 that may be loaded into the memory 206 and executed by the microprocessor 204 or circuitry 202.

In certain embodiments, the program logic 210 including code 212 may be stored in the storage 208, or memory 206. In certain other embodiments, the program logic 210 may be implemented in the circuitry 202. Therefore, while FIG. 2A shows the program logic 210 separately from the other elements, the program logic 210 may be implemented in the memory 206 and/or the circuitry 202.

Figure 2B:
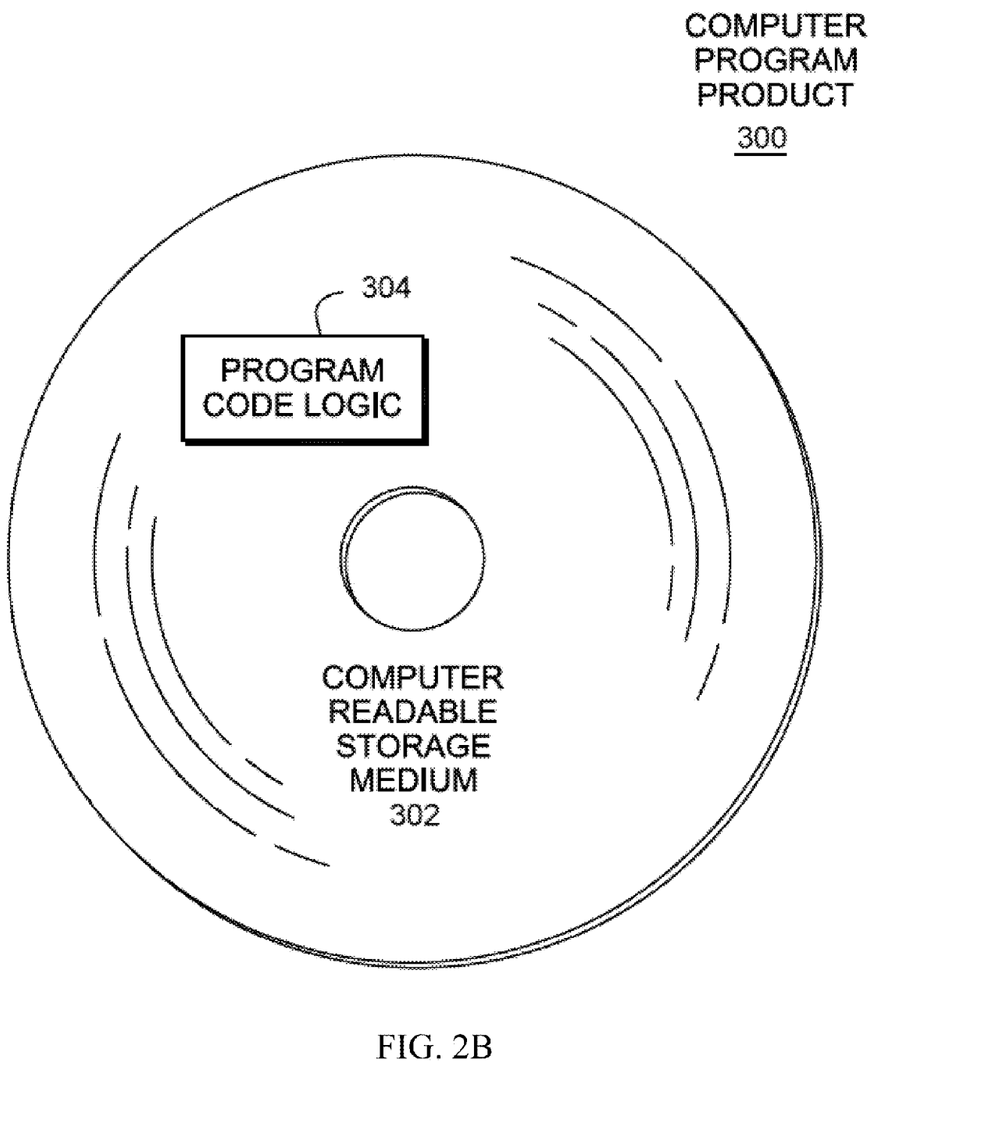
FIG. 2B depicts one embodiment of a computer program product incorporating one or more aspects of the present invention.

Using the processing resources of a resource 200 to execute software, computer-readable code or instructions, does not limit where this code can be stored. Referring to FIG. 2B, in one example, a computer program product 300 includes, for instance, one or more non-transitory computer readable storage media 302 to store computer readable program code means or logic 304 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

FIG. 3A depicts re-sampling at different rates, in accordance with one or more aspects of the present invention. In the depicted example, re-sampling of the $\sqrt{n}\times\sqrt{n}$ point in accordance with Equation (2) above, is depicted for different sampling rates.

Figure 3B:
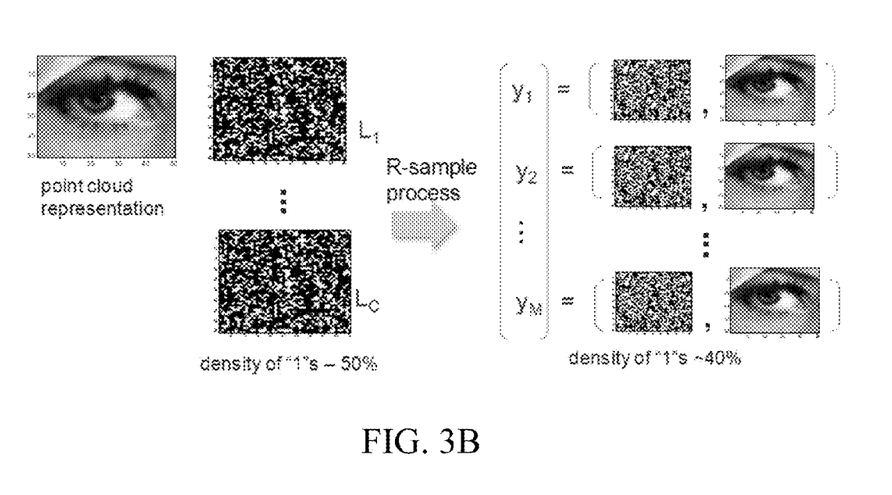
FIG. 3B depicts re-sampling in a collaborative scenario, in accordance with one or more aspects of the present invention.

FIG. 3B depicts re-sampling in a collaborative scenario, in accordance with one or more aspects of the present invention. In an embodiment, multiple systems, such as LIDAR capture systems, independently capture data of the desired scene. In such an embodiment, data from each system is then combined to obtain combined data of the scene, and the present techniques are used to recover the combined data of the scene.

Figure 4A:
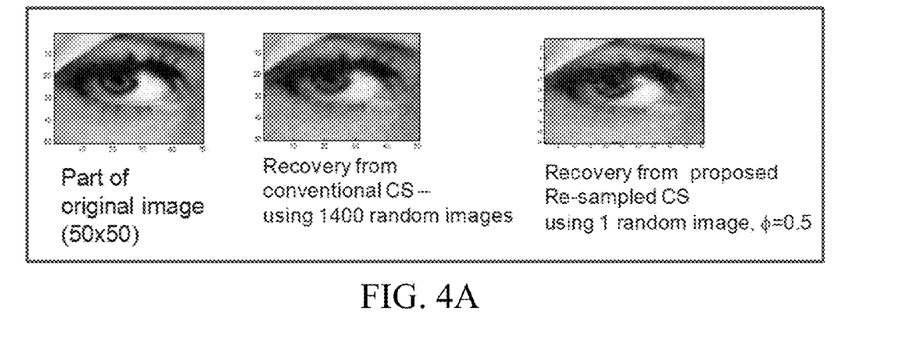
FIG. 4A depicts an example comparison of an original image, conventional compressive sensing recovery, and the present technique, in accordance with one or more aspects of the present invention.

FIG. 4A depicts an example of comparison of an original image, conventional recovery, and re-sampling recovery of the present technique, in accordance with one or more aspects of the present invention. In this example, the left picture is the original 50×50 image. For comparison, we apply the conventional CS technique and set m to be 1400 (corresponding to the LIDAR point cloud sampled for 1400 times). As shown in the comparison, the conventional recovery is quite good. We next apply the proposed re-sampling matrix B, and the CS recovery procedure as given in (8). Note that only one set of random samples of the image with sampled rate of $\phi=0.5$ is needed. The recovery shown at the right side of FIG. 4A shows that its visual effect is close to that of the conventional CS recovery, but with a saving of 50% of samples.

Figure 4B:
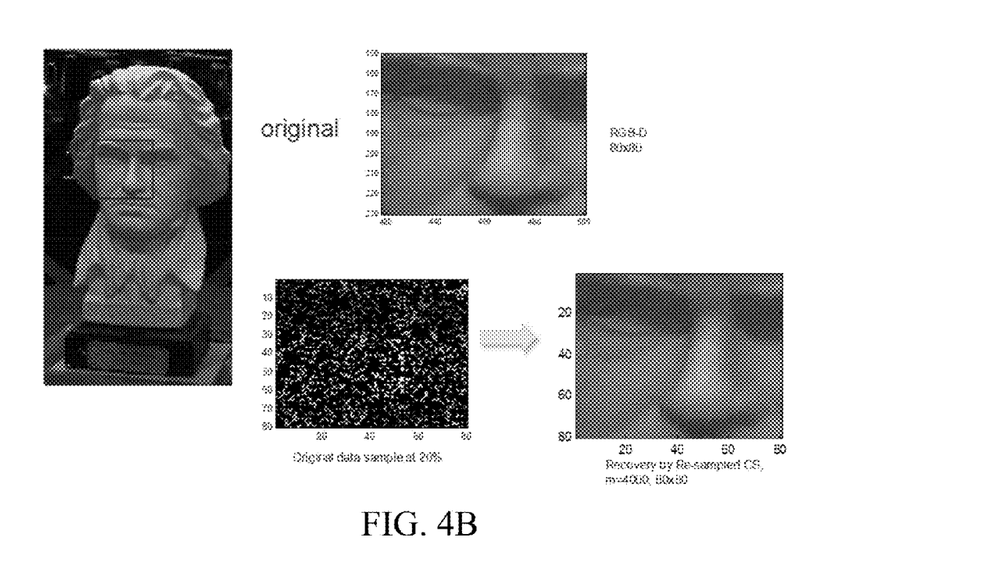
FIG. 4B depicts another example of recovery of the present technique showing comparison of original image, degradation using 20% of samples, and the recovered image using the present technique, in accordance with one or more aspects of the present invention.

FIG. 4B depicts another example of comparison of an original image, a degraded image, and re-sampling compressive sensing recovery of the present technique, in accordance with one or more aspects of the present invention. FIG. 4B further shows the result of applying re-sampling CS to an RGB-Depth scene. In this case, we have reduced the samples ($\phi$) to 20%. It is interesting to note that the reconstructed depth image has no noticeable degradation. It can be seen that the 20% sampled data (middle lower picture) is non-recognizable to human eyes but the re-sampled CS recovery (right lower picture) is readily recognizable. This suggests that if the original image is badly damaged or sub-sampled, recovery is still possible.

Figure 4C:
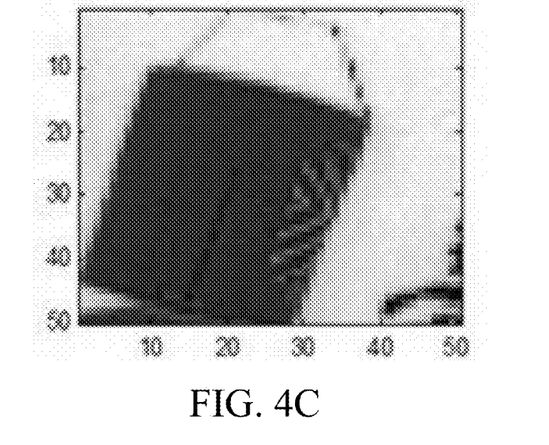
FIG. 4C depict another example of recovery of the present technique showing original data of a scene, in accordance with one or more aspects of the present invention.
Figure 4D:
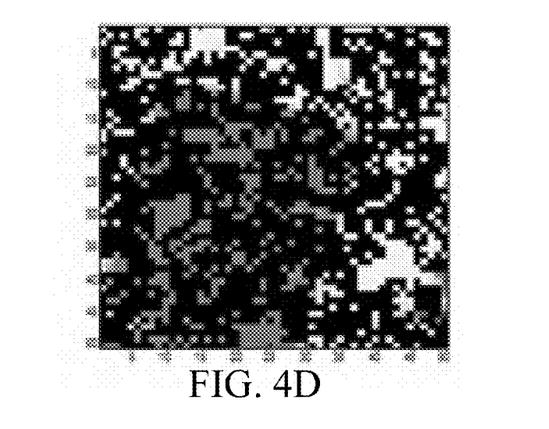
FIG. 4D depicts another example of recovery of the present technique showing occluded data of the scene of FIG. 4C, in accordance with one or more aspects of the present invention.
Figure 4E:
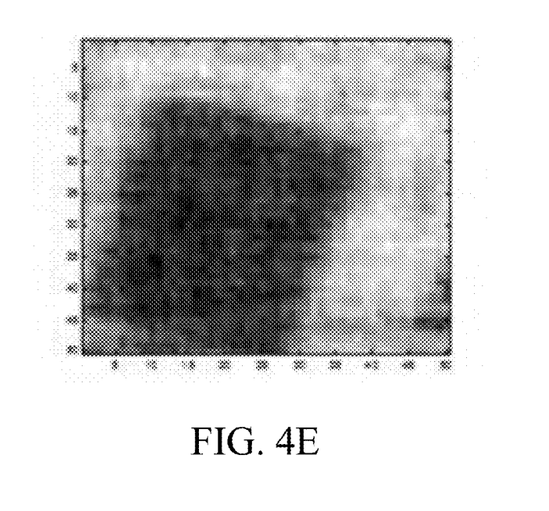
FIG. 4E depict another example of recovery of the present technique showing recovered data of the scene of FIG. 4D, in accordance with one or more aspects of the present invention.

FIGS. 4C-4E depict another example of recovery of the present technique showing an original data of a scene, occluded data of a scene, and recovered data of a scene, in accordance with one or more aspects of the present invention. In particular, FIG. 4C illustrates an original 50×50 scene showing a paint can, FIG. 4D illustrates an occluded 50×50 scene in which 70% of the original pixels are missing, and FIG. D. illustrates an enhanced recovered scene.

By way of example, a LIDAR system can be used to scan the environment to locate an object of interest, such as a paint can. However, the LIDAR system may not be able to obtain a complete scan of the object because the LIDAR signal path could be partially obstructed and/or occluded. For example, the obstructing media can be anything that blocks the path of the LIDAR signal, such as leaves, branches, or man-made objects. In such a case, the pattern of occlusion may be arbitrary, random, irregular, or regular. By contrast with the previous example, the obstructing pattern (e.g., occlusion) may not have any pre-determined statistical property, and may be non-Gaussian. The present techniques allow for recovery of the occluded object, specifically the missing samples, to facilitate identification of the object, as demonstrated in FIG. 4E, which is clearly more recognizable as a paint can than the occluded image of FIG. 4D.

In such a case, the present techniques can be used to recover scene data of such an occluded object, allowing for enhancement of scene data. By contrast with other examples recited herein, the randomly-sampled data in the occlusion application is due to the random occlusion pattern, rather than specifically collecting fewer samples. Note that this distinction is important since the missing samples cannot be obtained by performing further sampling due to the occlusion.

In one embodiment, the technique can be implemented as follows. First, let the LIDAR scan of the occluded object be given by $x_{r_s}$, in which the missing samples correspond to the occluded samples. Using Eq. (4), i.e. $y_b = B x_{r_s}$, we obtain the CS sensing data $y_b$, where B is generated using the same procedure as described above.

For example, the result of applying the present technique illustrated in FIGS. 4C-4E, in which a LIDAR depth map of half-gallon paint can is first obtained using a time-of-flight LIDAR camera. In such a case, there are 70% of missing (blocked) samples with the blockage size varying from 1 to 15 consecutive samples in both horizontal and vertical directions. One way to demonstrate the improvement is to use a metric of Peak-Signal-to-Noise (PSNR), defined as: PSNR=$20*\log_{10}$(maxL)$-10*\log_{10}$(MSE), where maxL is the maximum LIDAR sample value and MSE is the mean square error. As shown in FIG. 4C, the occluded depth map has a PSNR of 7.1 dB. After applying the present technique, the recovered paint can is shown to have a PSNR of 16.4 dB, which gives a 9.3 dB of improvement, in this example. The improvement is expected to increase the probability of object identification or to improve the quality of human visualization.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   obtaining, by at least one processor, data of a scene;
   re-sampling, by the at least one processor, the data of the scene to obtain re-sampled sensing data of the scene and a corresponding sensing matrix, the re-sampling using a series of entries, corresponding to a sampling rate for the data of the scene, and a probability parameter to control creation of the sensing matrix, the creation of the sensing matrix comprising probabilistically assigning values of the sensing matrix by evaluating the entries in the series of entries to determine whether a next entry of the series of entries indicates that a next value for the sensing matrix is to be a first value with a first probability or a second value with a second probability; and
   constructing, by the at least one processor, recovered data of the scene using the re-sampled sensing data of the scene and the corresponding sensing matrix.

2. The method of claim 1, wherein the data of the scene comprises occluded data of the scene, and the constructing comprises:
   enhancing the occluded data of the scene to construct the recovered data of the scene, wherein the recovered data of the scene facilitates identification of the scene.

3. The method of claim 1, further comprising:
   identifying, by the at least one processor, the scene using the recovered data of the scene.

4. The method of claim 1, wherein the obtaining comprises:
   compressing original data of a scene, the compressing comprising sampling the original data of the scene to select the data of the scene, wherein the original data of the scene has a first size and the data of the scene has a second size, the second size being smaller than the first size.

5. The method of claim 4, further comprising:
   transmitting, by the at least one processor, the data of the scene.

6. The method of claim 1, wherein the constructing comprises:
   minimizing an L1 norm of the recovered data of the scene, wherein the re-sampled sensing data of the scene is equal to an inner product of the sensing matrix and the recovered data of the scene.

7. The method of claim 1, wherein the constructing comprises:
   minimizing an L1 norm of the recovered data of the scene.

8. The method of claim 1, wherein the constructing comprises:
   selecting the re-sampled sensing data of the scene to be equal to an inner product of the sensing matrix and the recovered data of the scene.

9. The method of claim 1, wherein the obtaining comprises:
   randomly sampling the scene to determine the data of the scene.

10. The method of claim 9, wherein the random sampling comprises non-Gaussian sampling.

11. A computer system comprising:
a memory; and
at least one processor in communication with the memory, wherein the computer system is configured to perform a method, said method comprising:
   obtaining, by the at least one processor, data of a scene;
   re-sampling, by the at least one processor, the data of the scene to obtain re-sampled sensing data of the scene and a corresponding sensing matrix, the re-sampling using a series of entries, corresponding to a sampling rate for the data of the scene, and a probability parameter to control creation of the sensing matrix, the creation of the sensing matrix comprising probabilistically assigning values of the sensing matrix by evaluating the entries in the series of entries to determine whether a next entry of the series of entries indicates that a next value for the sensing matrix is to be a first value with a first probability or a second value with a second probability; and
   constructing, by the at least one processor, recovered data of the scene using the re-sampled sensing data of the scene and the corresponding sensing matrix.

12. The computer system of claim 11, wherein the data of the scene comprises occluded data of the scene, and the constructing comprises:
   enhancing the occluded data of the scene to construct the recovered data of the scene, wherein the recovered data of the scene facilitates identification of the scene.

13. The computer system of claim 11, wherein said method further comprises:
   identifying, by the at least one processor, the scene using the recovered data of the scene.

14. The computer system of claim 11, wherein the obtaining comprises:
   compressing original data of a scene, the compressing comprising sampling the original data of the scene to select the data of the scene, wherein the original data of the scene has a first size and the data of the scene has a second size, the second size being smaller than the first size.

15. The computer system of claim 11, wherein the constructing comprises:
   minimizing an L1 norm of the recovered data of the scene, wherein the re-sampled sensing data of the scene is equal to an inner product of the sensing matrix and the recovered data of the scene.

16. A computer program product comprising:
a computer readable storage medium readable by a processing circuit and storing instructions for execution by the processing circuit for performing a method comprising:
   obtaining, by at least one processor, data of a scene;
   re-sampling, by the at least one processor, the data of the scene to obtain re-sampled sensing data of the scene and a corresponding sensing matrix, the re-sampling using a series of entries, corresponding to a sampling rate for the data of the scene, and a probability parameter to control creation of the sensing matrix, the creation of the sensing matrix comprising probabilistically assigning values of the sensing matrix by evaluating the entries in the series of entries to determine whether a next entry of the series of entries indicates that a next value for the sensing matrix is to be a first value with a first probability or a second value with a second probability; and
   constructing, by the at least one processor, recovered data of the scene using the re-sampled sensing data of the scene and the corresponding sensing matrix.

17. The computer program product of claim 16, wherein the data of the scene comprises occluded data of the scene, and the constructing comprises:
   enhancing the occluded data of the scene to construct the recovered data of the scene, wherein the recovered data of the scene facilitates identification of the scene.

18. The computer program product of claim 16, wherein said method further comprises:
   identifying, by the at least one processor, the scene using the recovered data of the scene.

19. The computer program product of claim 16, wherein the obtaining comprises:
   compressing original data of a scene, the compressing comprising sampling the original data of the scene to select the data of the scene, wherein the original data of the scene has a first size and the data of the scene has a second size, the second size being smaller than the first size.

20. The computer program product of claim 16, wherein the constructing comprises:
   minimizing an L1 norm of the recovered data of the scene, wherein the re-sampled sensing data of the scene is equal to an inner product of the sensing matrix and the recovered data of the scene.

* * * * *